Jan. 24, 1928.
B. R. KENWORTHY ET AL
1,657,402
LOCKING DEVICE
Filed March 29, 1927
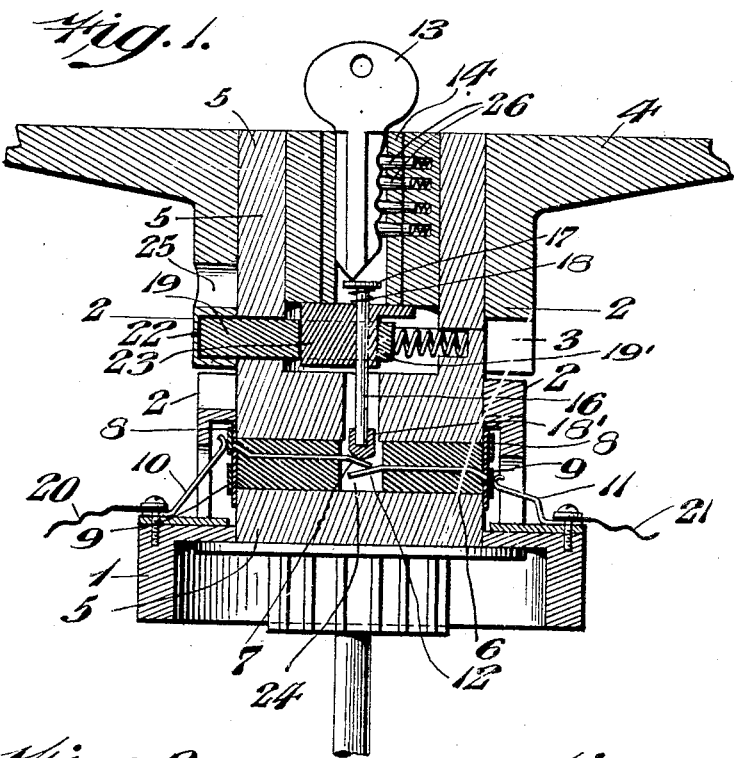
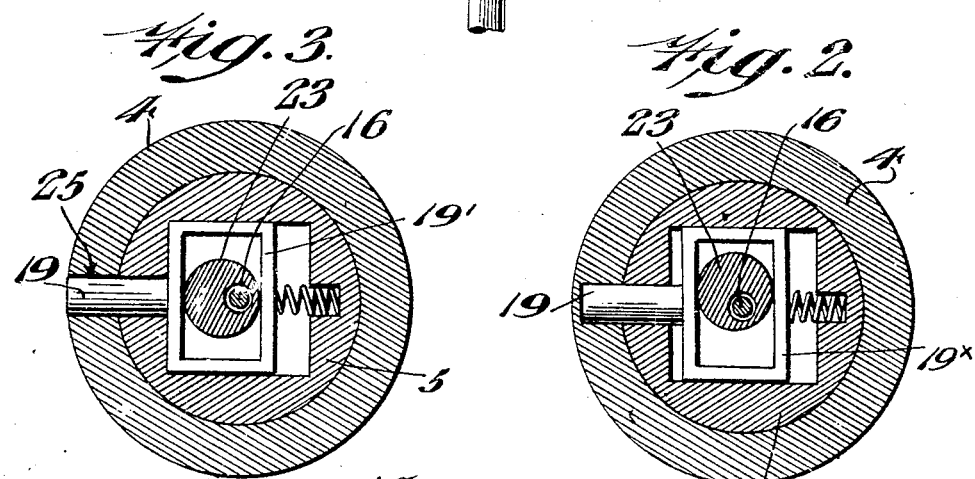
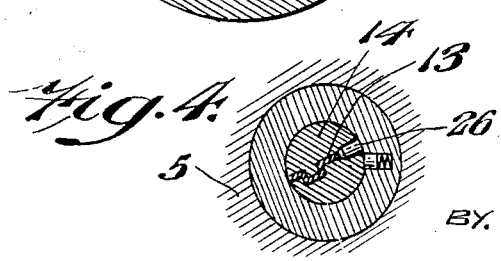
INVENTORS
BYRON R. KENWORTHY,
ROBERT R. KENWORTHY,
BY
ATTORNEYS.

Patented Jan. 24, 1928.

1,657,402

UNITED STATES PATENT OFFICE.

BYRON R. KENWORTHY AND ROBERT R. KENWORTHY, OF PHILADELPHIA, PENNSYLVANIA, ASSIGNORS OF ONE-FOURTH TO JOHN F. DALY AND ONE-FOURTH TO WILLIAM DONAHUE, BOTH OF PHILADELPHIA, PENNSYLVANIA.

LOCKING DEVICE.

Application filed March 29, 1927. Serial No. 179,207.

This invention relates to locking mechanism or a locking device for various purposes, although it has especial relation to locking mechanism for motor cars, particularly as mounted in relation to the steering wheel post.

The leading object of the present invention may be said to reside in the provision of mechanism of the character stated which is simple in construction, comparatively inexpensive to manufacture, and which may be readily applied to existing structures, for example, automobile steering wheel posts, by reason of which starting of the automobile is prevented when the mechanism is properly set by the driver.

A further object of the present invention is to provide mechanism or a device of the character stated in which electrical contact is made between a moving part and some source of electrical energy, as for instance between the steering wheel of an automobile and the magneto, battery, or generator of the automobile.

A still further object of the present invention is to provide an automobile steering wheel lock in which a key is insertible through the top of the steering wheel for contact with certain electrical connections for the making and breaking of electrical connection with the automobile ignition circuit.

Other and further objects reside in the provision of general details of construction and in the arrangement and combination of parts hereinafter to be described.

The invention consists of the novel construction hereinafter described and finally claimed.

The nature, characteristic features and scope of the invention will be more fully understood from the following description taken in connection with the accompanying drawings forming part hereof and in which;

Fig. 1, is a fragmentary view in central section of the steering wheel mechanism in unlocked or open position of an automobile and illustrates one embodiment of the present invention.

Fig. 2, is a view in horizontal section taken upon the line 2—2 of Fig. 1.

Fig. 3, is a view similar to Fig. 2 but showing another position of the locking device.

Fig. 4, is a fragmentary view in cross-section showing the key in locked or unremovable position.

For the purpose of illustrating our invention we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

Referring to the drawings in detail, the reference numeral 1 designates the base of the device. Formed integral with the base and projected upwardly therefrom are serrated portions or lugs 2 with which similar serrations or lugs 3 of for example the steering wheel 4 are adapted to cooperate, although obviously in lieu of the steering wheel, which is shown for explanatory purposes, some other element to be locked can be employed. Positioned within the base 1 is the hub 5 carrying the parts of the steering mechanism to be detachably secured with respect to the steering wheel 4. Mounted within the hub 5 is a block of insulating material 6 arranged within which are contact blades 7 and 12. These contact blades are adapted to form electrical connection with annular contacts or bands 8 and 9. The contacts 8 and 9 in turn during rotation of the hub 5 contact with spring contacts 10 and 11 respectively, which contacts are secured to the base 1, as clearly shown in Fig. 1. These contacts 10 and 11 are in electrical connection with the ignition circuit of an automobile and not shown in the present drawings. The block of insulating material 6 is centrally apertured at 24 through which the ends of contacts 7 and 12 project, it being understood that the projected ends of contacts 7 and 12, as shown in Fig. 1, provide a closing of the circuit to the ignition and in this connection it is also to be understood that the steering wheel of the automobile is in unlocked position. In other words, the steering wheel is unlocked with respect to the rotatable hub so that the circuit to the ignition is closed and in this position of parts the key 13 is locked against removal. The key 13 is adapted for insertion within a barrel 14 of conventional type, as carried by the steering wheel 4. Below the barrel 14 is arranged a cam member 23 through which passes and is guided a vertical stem 16 having at its top a head 17, and having at its bottom a plunger 18'. This spindle 16 is normally maintained out of contact with contact 7 by means of spring 18. However, with the insertion of key 13, spindle 16 is depressed against the action of spring 18, thereby causing contact 7 to impinge upon contact 12, as shown in Fig. 1. With the depression of spindle 16, the key is turned to unlock the steering wheel with respect to the hub 5, this movement serving to withdraw slidable bolt 19 from aperture 25 of steering wheel 4, so that the steering wheel may be lifted to disengage the serrations 3 thereof from the serrations 2 of the base.

In operation the insertion of the key 13 makes contact by depression of the spindle 16 through contact 7 to the ignition circuit. This permits the uninterrupted flow of current from wire 20, through contact 10, to band 8, thence to contacts 7 and 12, band 9, sliding contact 11 and wire 21, which completes the circuit. The rotation of the hub within its base fails to interrupt the circuit as the bands 8 and 9 completely encircle the hub and thereafter continue to be exposed to contact with the sliding contacts 10 and 11. Removing the key 13 serves to break the contact between the contacts 7 and 12 and it is necessary that the key be kept in the lock at all times so that the motor may be kept running. In order that the key 13 cannot be removed except in the closed position of the steering wheel with respect to the hub, the recess 22 is shallow so as not to permit the bolt 19 to have a full throw; or in other words, the cam 23, see Figs. 2 and 3, remains with its center off the center line of the bolt, therefore keeping the rotatable section of the barrel 14 in such position that the conventional tumblers 26 thereof do not quite meet in alignment. These disaligned pins meshing with the serrations of the key prevent removal of the key in the position shown in Fig. 1.

It will now be apparent that we have devised a novel and useful construction which embodies the features of advantage enumerated as desirable in the statement of the invention and the above description and while we have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described our invention what we claim as new and desire to secure by Letters Patent, is:

1. In a device of the character stated, a stationary member having clutch teeth, a second member rotatable with respect thereto and having clutch teeth for removable engagement with respect to the first mentioned teeth, a key receiving element, including a conventional barrel, an electrical connection operatively arranged for cooperation with an ignition circuit, means carried by said rotatable member for making contact with said circuit, the making of such contact to close said circuit being accomplished by key insertion in said barrel, and means to prevent key removal during a locked position of parts.

2. In a device of the character stated, a stationary member having clutch teeth, a second member rotatable with respect thereto and having clutch teeth for removable engagement with respect to the first mentioned teeth, a key receiving element, including a conventional barrel, an electrical connection operatively arranged for cooperation with an ignition circuit, including a bolt and cam for releasing said rotatable member with respect to said stationary member, means carried by said rotatable member for making contact with said circuit, the making of such contact to close said circuit being accomplished by key insertion in said barrel, and means to prevent key removal during a locked position of parts.

3. In a device of the character stated, a stationary member having clutch teeth, a second member rotatable with respect thereto and having clutch teeth for removable engagement with respect to the first mentioned teeth, a key receiving element, including, a conventional barrel, an electrical connection operatively arranged for cooperation with an ignition circuit, means including a depressible, spring controlled member carried by said rotatable member for making contact with said circuit, the making of such contact to close said circuit being accomplished by key insertion in said barrel, and means to prevent key removal during a locked position of parts.

4. In a device of the character stated, a stationary member having clutch teeth, a second member rotatable with respect thereto and having clutch teeth for removable engagement with respect to the first mentioned teeth, a key receiving element, including a conventional barrel, an electrical connection operatively arranged for cooperation with an ignition circuit, means carried by said rotatable member for making contact with said circuit, the making of said contact to close said circuit being accomplished by key insertion in said barrel, and a horizontally disposed bolt for interlocking said stationary member and rotatable member in desired position in which interlocked position of parts key removal is prevented.

In testimony whereof, we have hereunto signed our names.

BYRON R. KENWORTHY.
ROBERT R. KENWORTHY.